US006622655B2

(12) United States Patent
Springett

(10) Patent No.: US 6,622,655 B2
(45) Date of Patent: Sep. 23, 2003

(54) AUTOMATIC ANIMAL FOOD DISPENSER

(76) Inventor: Alan John Springett, 12 Kentwell Road, Allambie, NSW 2100, Sydney (AU)

( * ) Notice: Subject to any disclaimer, the term of this patent is extended or adjusted under 35 U.S.C. 154(b) by 0 days.

(21) Appl. No.: 10/203,256

(22) PCT Filed: Apr. 18, 2002

(86) PCT No.: PCT/AU02/00479
§ 371 (c)(1),
(2), (4) Date: Aug. 7, 2002

(65) Prior Publication Data
US 2003/0116093 A1 Jun. 26, 2003

(30) Foreign Application Priority Data
Dec. 20, 2001 (AU) ................................ PR9637
Feb. 6, 2002 (AU) ............................... 15424/02

(51) Int. Cl.[7] ................................................ A01K 1/10
(52) U.S. Cl. ...................................... 119/61; 119/51.01
(58) Field of Search ...................... 119/61, 51.01, 119/51.11, 51.02, 52.1, 53, 57.1

(56) References Cited

U.S. PATENT DOCUMENTS

| 3,762,373 A | * | 10/1973 | Grossman | 119/51.11 |
| 4,279,221 A | * | 7/1981 | Arvizu | 119/51.11 |
| 4,422,409 A | * | 12/1983 | Walker et al. | 119/51.11 |
| 4,522,152 A | * | 6/1985 | Meyer | 119/56.1 |
| 4,993,364 A | * | 2/1991 | Hessenauer | 119/51.11 |
| 5,046,455 A | * | 9/1991 | Christiansen et al. | 119/56.1 |
| 5,140,944 A | * | 8/1992 | Jeng | 119/51.11 |
| 5,230,300 A | * | 7/1993 | Mezhinsky | 119/51.11 |

FOREIGN PATENT DOCUMENTS

| KR | WO 01/22808 | * | 9/2000 | 119/51.11 |
| WO | WO 01/22808 | | 4/2001 | |

* cited by examiner

*Primary Examiner*—Charles T. Jordan
*Assistant Examiner*—Judith A. Nelson
(74) *Attorney, Agent, or Firm*—Koda & Androlia

(57) ABSTRACT

An automatic food dispenser for animals, fish or the like, comprising a housing, controls, and with a hopper within, for containing food, the base of the hopper having an opening for the food to exit, and the opening is in close proximity to a dispensing mechanism. The mechanism has a surface, thus creating a sufficient seal to prevent the undesired escape of food from the hopper and has an aperture on its surface, whereupon, with the rotation of the dispensing mechanism about its axis, and the subsequent alignment of the aperture with opening at the base of the hopper, feed may escape from the hopper through the aperture, and hence directly through the open base of the dispensing mechanism, the volume of feed dispensed being a function of the variable speed of rotation, and the number of "to and fro" motions of the dispensing mechanism past the feed exit.

11 Claims, 3 Drawing Sheets

AUTOMATIC ANIMAL FOOD DISPENSER

BACKGROUND OF THE INVENTION

1. Field of the Invention

The present invention relates to a dispenser, for automatically feeding animals or fish, and refers to in particular, but not exclusively, to the feeding of dogs and cats.

2. Prior Art

For many people who own pets, going away for a short duration presents problems, because the pet needs to be fed whilst the owner is absent. It was found that the existing art to solve this problem is not entirely satisfactory. Such machines that are commercially available are of a type that are not reliable due to their flimsy structure and size, nor do they apportion from a central food store, and hence are not labour saving, and so are not of use outside of those times when the owner is away.

Prior art patents which relate to the present invention are listed below together with a short description of their relevancy.

U.S. Pat. No. 4,522,152 issued Feb. 24, 1984 to James Meyer

This patent discloses a mechanical device utilizing a drum, that is filled by a hopper above, and a variable volume of feed can be dispensed into the drum, and dispensed from this drum, by manually rotating same. The amount of manual rotation will vary the amount dispensed.

U.S. Pat. No. 4,993,364 issued Jun. 12, 1990 to John Hessenauer

This patent discloses a longitudinal cylinder of two longitudinal compartments, one which fills, whilst the other empties itself of its contents. The flexible strip is on one side only.

U.S. Pat. No. 4,279,221 issued Apr. 21, 1980 to Oscar Arvizu

This patent discloses what are two longitudinal compartments (not in an enveloping tube), similar to U.S. Pat. No. 4,993,364.

U.S. Pat. No. 5,230,300 issued Jul. 20, 1992 to Victor Mezhinsky

This patent discloses a machine where, like a paddle wheel, the vanes on the shaft are the means of capturing and "moving" the food from the hopper.

WO 01/22808 published Apr. 5, 2001 to Choi, Chui Soo

This patent discloses a cylinder where feed fills a hollow, that is held, to be subsequently dumped upon further 360 degree rotation(s).

U.S. Pat. No. 5,046,455 issued Dec. 17, 1990 to Steven Christionsen

This patent discloses an endless belt (conveyor belt).

U.S. Pat. No. 4,422,409 issued Dec. 27, 1983 to Ralph Walker

This patent discloses a rotary table which contains the food.

U.S. Pat. No. 3,762,373 issued Oct. 2, 1973 to Gary Grossman

This patent discloses a pair of circular rotary discs, clamped together, and working together, to dispense.

U.S. Pat. No. 5,140,944 issued Aug. 25, 1992 to Jeng, Jieh-Chin

This patent discloses four rotating tubes.

SUMMARY OF THE INVENTION

This problem is overcome by the current invention, which can securely mount, is substantial physically, and in this embodiment, suitable to mount on a wall. It has digital timing and controls, and will hold a substantial volume of food in a central storage section, from which the desired volume of food will be apportioned and dispensed. This enables the dispenser to be useful even when owners are at home, as it is labour saving.

The invention is an automatic food dispenser, in this embodiment feeding granular dry food, that can be set by the owner to automatically dispense a predetermined (and owner alterable) volume of food, at a time and location suitable for the owner.

It is a dispenser that may be kept off the ground, by being attached to a wall (or such appropriate surface), or it may sit within an optional stand if desired, however, the shape, size and mounting method of the dispenser is not the essence of the invention.

The dispenser comprises a hopper in the upper part, electronics with a control panel, and a dispensing mechanism (and related components) positioned under the hopper (in this embodiment) so as to be able to be in contact with the feed exit, or plurality of feed exits, of the hopper. The dispensing mechanism approximates a semi-tube, similar to a horse shoe shape in section, of a length to suit the hopper and hopper feed exit, said dispensing mechanism rotating about a horizontal axis, driven directly or indirectly by a motor, positioned at the base of a hopper (which will contain the food), where the semi-tube's surface seals the feed exit of the hopper. The semi-tube will have an aperture in its surface, for the food to escape through, when said aperture is aligned with the hopper's base. Note that the sealing function of the surface of the semi-tube can be achieved also by a flat surface, being rotated about a vertical axis, and may also have an aperture or apertures to allow feed to escape, when aligned. However, the inventor feels that the semi-tube provides the best method, and so is used in this embodiment. The aperture may be divided into, or be, a number of apertures if this enhances the dispensing of whatever food may be getting dispensed. Hence, more than one aperture is possible, but in this embodiment, only one is present on the dispensing mechanism.

An escape of food will occur when the semi-tube is rotated to bring about an alignment of the dispensing mechanism's aperture with the feed exit at the hopper's base. The inventor feels that the best practice is to have the feed exit of the hopper at the bottom of the hopper, because the feed simply exits the hopper by gravity. It may be possible to have a feed exit elsewhere (for example, on the lower part of a side wall) but this would not be as efficient. Also, this would bring about a repositioning of the dispensing mechanism, or mechanisms, for example, if the feed exit was on a perpendicular wall, the semi-tube dispensing mechanism would now rotate about a vertical axis.

Therefore, in the disclosed embodiment, with the feed exit at the base of the hopper, the alignment of the semi-tube dispensing mechanism's aperture with the feed exit shall occur, when said aperture is at approximately the apex or 12 o'clock position. As the aperture moves past the feed exit, feed will escape due to the aperture offering no resistance, and it will fall directly through the aperture, and hence directly through the open section (or base) of the semi-tube, into the bottom of the machine, where it falls out of the machine through an opening. Said opening may include a means of directing the feed. The rotation of the dispensing mechanism will continue, so that the aperture is now moved away from the feed exit of the hopper (to approximately a 3 o'clock or 9 o'clock position), thus sealing the feed exit of the hopper again, against the surface of the semi-tube. At this time, the rotation may stop, or a reverse of that action will permit a repetition of the food portion dispensed. Therefore, a "to and fro" action will provide a plurality of portions dispensed. For example, to have two "to and fro" movements will result in four positions dispensed, or one and a half motions will result in three portions to be dispensed.

Additionally, the speed of the dispensing mechanism's rotation can be adjusted and selected by the owner, hence, if a slower motion is selected, more feed will escape resulting in a larger portion (volume) to be dispensed. Therefore, the owner may thus select what size portion is desired, and also, as described above, how many of said portions.

The reliability of operation of this invention (for example, overcoming the possibility of the dry particles "jamming" the movement of the dispensing mechanism) will be enhanced by the physical contact, or near proximity, between the dispensing mechanism and the feed exit of the hopper, to have a flexible and resilient interface.

This can be done by the fitting of a flexible and/or resilient apron to the base of the hopper's feed exit (e.g., a rubber apron). Although the fitting of a flexible and/or resilient interface to the dispensing mechanism's surface may achieve a similar result, the inventor feels the apron on the feed exit is the best practice. The dispenser will have a control panel to allow ease of use by the owner, which will include a timer (e.g., digital), for setting dispense times, and enable the owner to see (and set) any programmable parameters, such as, for example, size of, and number of, portions to be dispensed. The dispenser will dispense food according to those settings, plus be able to dispense at the owner's will, a volume of food, to test the operation or to provide an interim feed, with the activation of a switch (or switches).

The dispenser may have digital voice record and playback, so that the owner may leave a message of comfort for the animal (for example, if absent during a feed time).

The dispenser could provide an indication to the owner of the feed volume within the hopper, for example, via a window on the machine.

The dispenser may have standby battery backup, in the event of power failure, or to allow the machine to work remotely from mains power. A "battery low" indicator may be included onto the control panel.

The dispenser will have a degree of self diagnosis, with indication of errors. If may also have sensors to provide safety, such as if the access is open, the moving parts of the dispenser may dis-enable.

BRIEF DESCRIPTION OF THE DRAWINGS

The above-mentioned features and objects of the present invention will become more apparent with reference to the following description taken in conjunction with the accompanying drawings wherein like reference numerals denote like elements and in which.

DETAILED DESCRIPTION OF THE INVENTION

Figure 1:
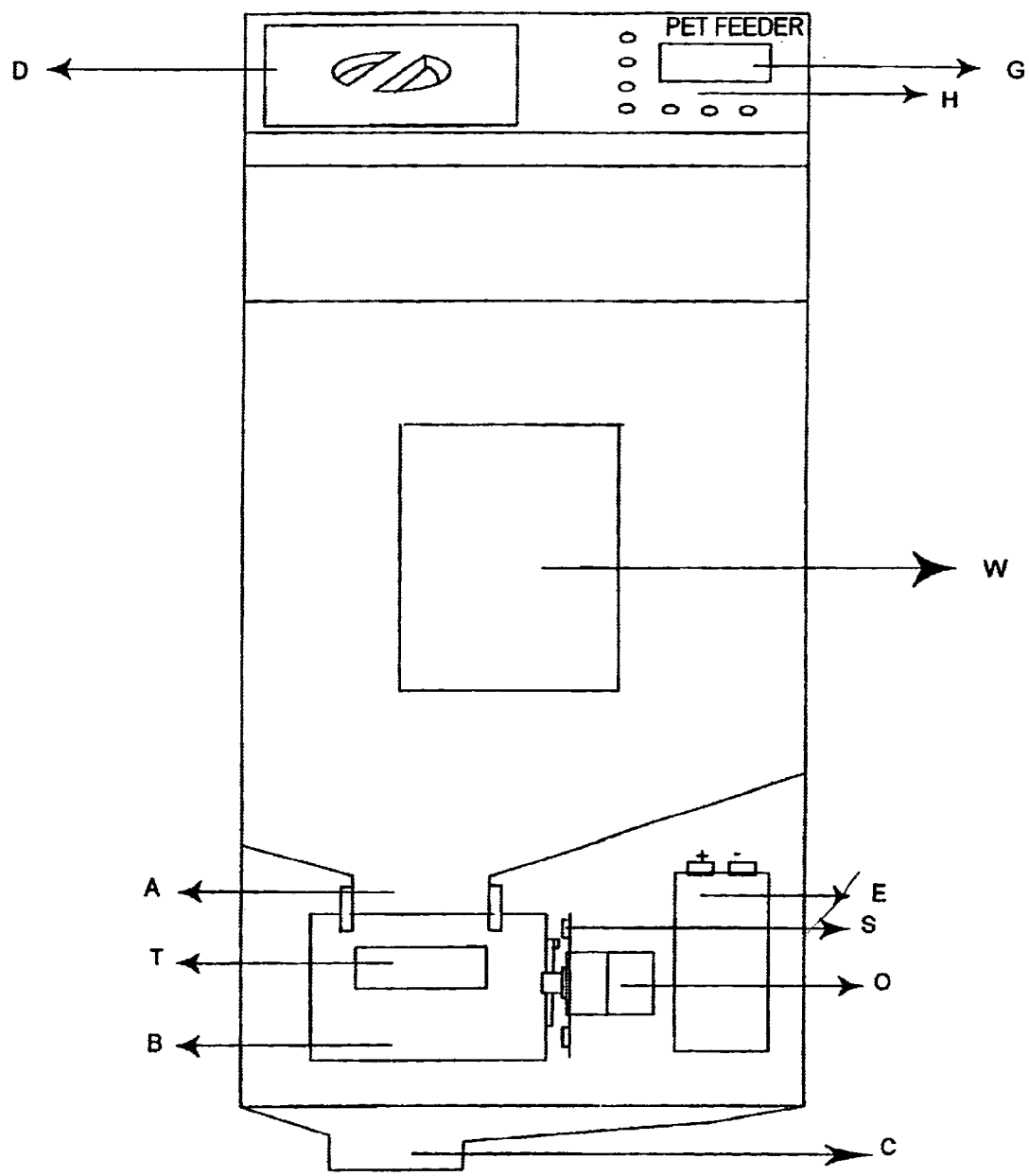
FIG. 1 is a front view of an animal food dispenser in accordance with the teachings of the present invention.
Figure 2:
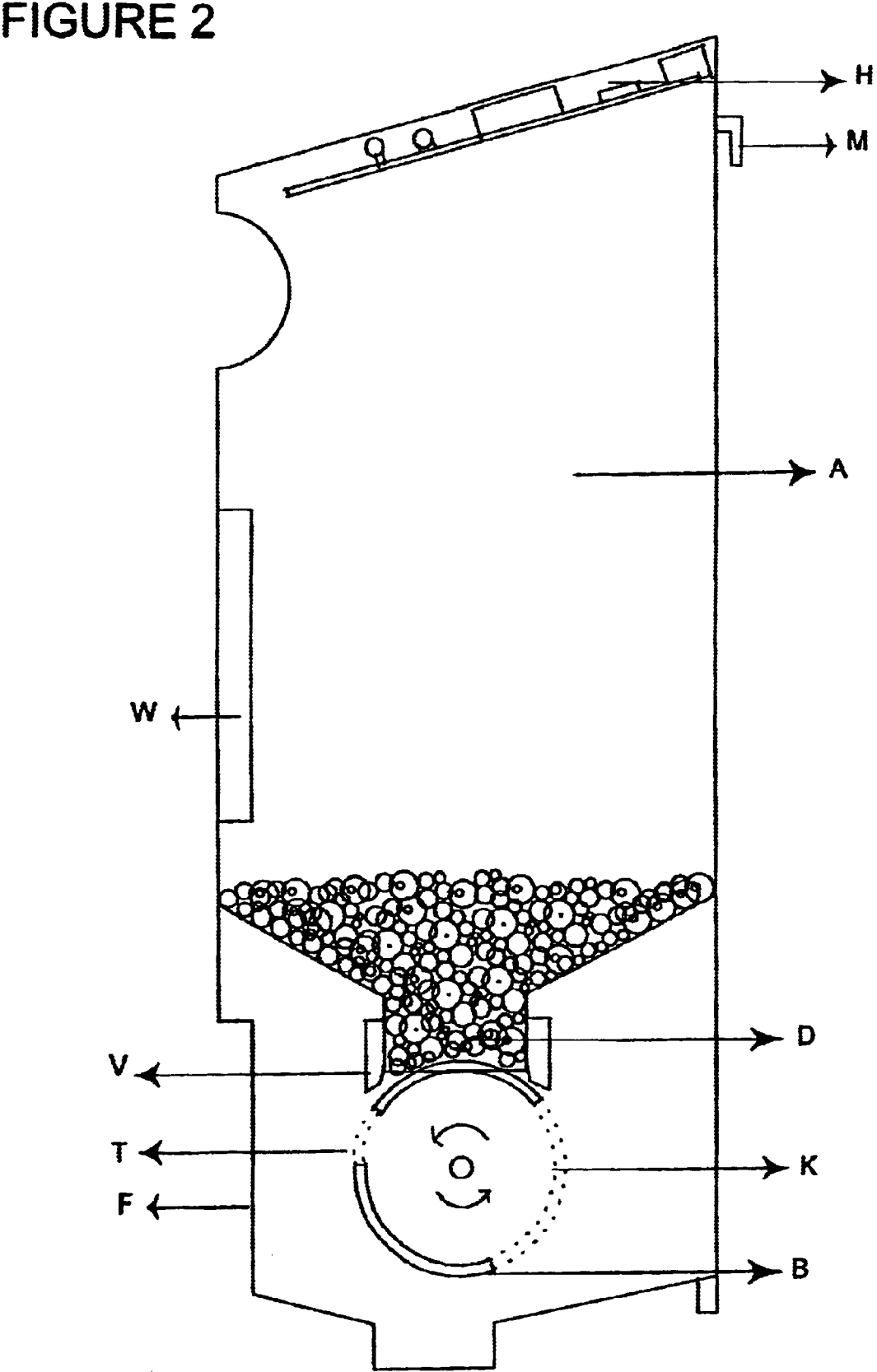
FIG. 2 is a side view of FIG. 1.
Figure 3A:
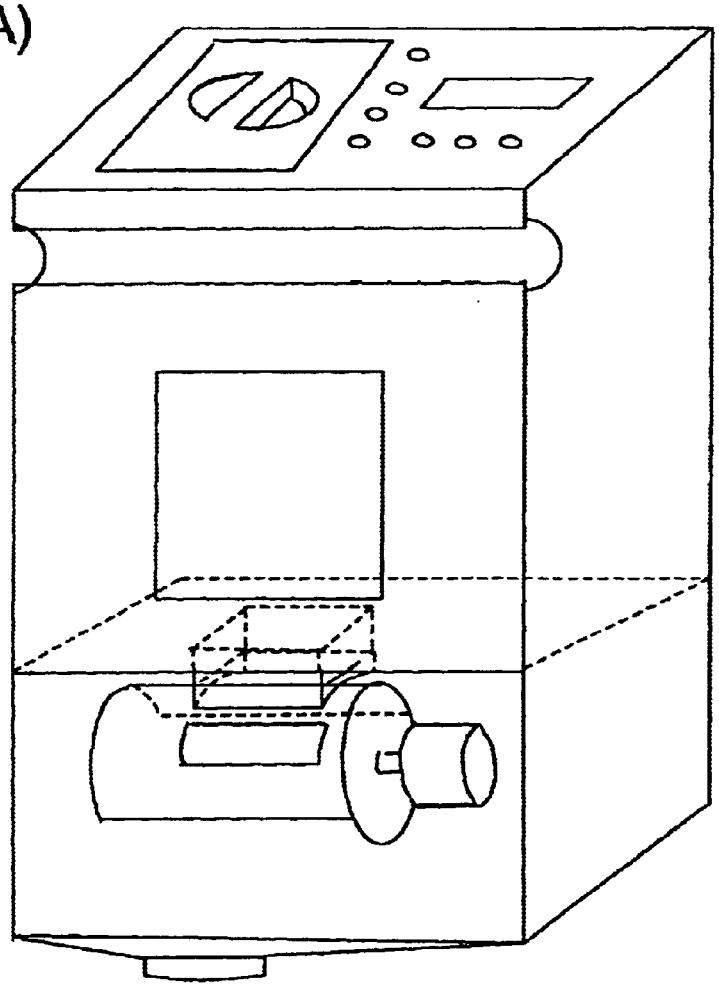
FIG. 3(A) is a phantom view illustrating the interior of the embodiment of FIG. 1.
Figure 3B:
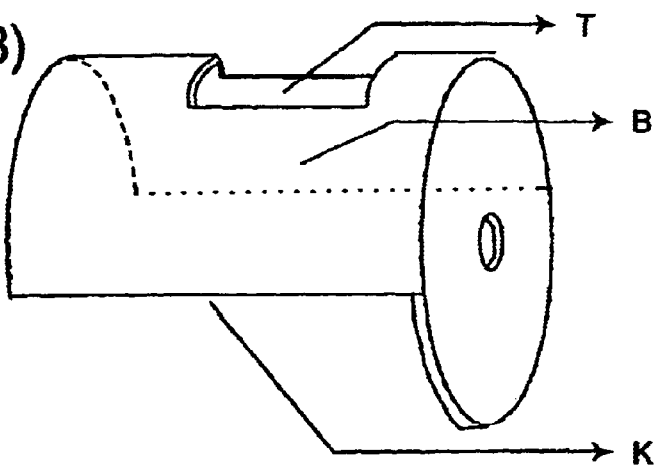
FIG. 3(B) is a view of the dispensing mechanism utilized within FIG. 3(A).

Referring to FIGS. 1, 2, 3(A) and 3(B), shown therein is an automatic animal food dispenser in accordance with the teachings of the present invention. In particular, the automatic animal food dispenser is a machine as is described in the paragraphs below.

The machine exit opening (c) may require a slide to direct the food into a bowl. The door (i), which provides access into the unit, for loading food and to allow access for cleaning the inside of the hopper.

The dispensing mechanism (b) is approximately a semi-tube shape, being motor (o) actuated, directly or indirectly, but it may also be other electro-mechanical means, for example, a solenoid or linear actuator. Feed stores in hopper (a), exiting from the hopper's feed exit (d). When aperture (t) is aligned to (d), feed exits via (t) from the semi-tube directly via its open base (k). The timer on the control panel (g & h) is set by the owner.

The display of timer (h) will display time, and may show settings, as well as the size and number of portions. However, separate displays may be used. The control panel (g) will contain the necessary switch inputs and electronics to enable the owner to control the machine as required and it may, as an option, record and play back a digital voice recording at feed time.

Although the timer shall determine when feeds occur, the control panel shall have the ability to input for providing an interim feed, or to test operation.

The control panel's printed circuit board (h) is the main control/interface for the functions of, and the interconnections between, the component parts of the machine. The machine is powered by electricity, and may be powered by either or both AC or DC power, supplied from mains or generated connection, or by the use and connection of a suitable electric battery (e). The battery (e) will also act as a backup battery in the event of power failure. The body of the machine (r) may be made from a number of different materials, for example, metal or plastic. It may have mounting lugs positioned (m) to facilitate mounting onto a wall (in the embodiment shown in the drawing) or some other appropriate mounting surface, or, alternatively, it may be furnished with a suitable mounting stand, which may assist with portability.

The machine has means of indication of feed level in the hopper, in this embodiment by window (w). Panel (f) may remove to give access to moving parts and battery. Flexible apron at the exit of the hopper is shown (v).

What is claimed is:

1. An automatic food dispenser for animals, comprising a housing, controls and with a hopper within, for containing food, the base of said hopper having at least one opening for the food to exit through, said opening being in close proximity to a dispensing mechanism, said mechanism having a surface, thus creating a sufficient seal to prevent the undesired escape of food from said hopper, said dispensing mechanism having at least one aperture on its surface, whereupon, with the rotation back and forth of the dispensing mechanism about its axis, and the subsequent alignment of the aperture with the feed exit, a predetermined amount of feed may escape from the hopper through said aperture, and hence directly through the open base of the dispensing mechanism, and a means for rotating said dispensing mechanism back and forth.

2. An automatic food dispenser as per claim 1, wherein the dispensing mechanism is approximately a semi-tube shape, which rotates about longitudinal axis.

3. An automatic food dispenser as per claim 1, wherein the dispensing mechanism is an essentially flat surface, rotating about an axis to move said surface in an arc across the feed exit opening.

4. An automatic food dispenser as per claim 1, wherein the dispensing mechanism is able to provide a plurality of different volumes of feed dispensed, by virtue of its speed of rotation being alterable and/or selectable.

5. An automatic food dispenser as per claim 1, wherein the dispensing mechanism is able to dispense a plurality of feed volumes, or portions, through virtue of its ability to perform a number of selectable back and forth rotational motions about that point of alignment with the feed exit position, thus bringing about the situation where the aperture of the dispensing mechanism passes the feed exit, to once again seal, with each back and forth rotational motion.

6. An automatic food dispenser as per claim 1, wherein the dispensing mechanism is replaceable with another.

7. An automatic food dispenser as per claim 1, wherein an apron is provided to the mouth of the feed exit, for the purpose of providing a physical interface between said feed exit and the dispensing mechanism that reduce the likelihood of them being jammed by the particles of food.

8. An automatic food dispenser as per claim 4 wherein said apron is flexible and/or resilient.

9. An automatic food dispenser as per claim 1, wherein said means for rotating said dispensing mechanism directly or indirectly is selected from the group consisting of electrical or mechanical means.

10. An automatic food dispenser as per claim 1, wherein said control panel is provided with a means for the owner to record voice, and to have it play it back as required at dispense time.

11. An automatic food dispenser as per claim 1, wherein the dispenser has a battery back-up, for the purpose of maintaining the electronic settings, and to keep the machine operable in the event of power interruption or disconnection.

* * * * *